United States Patent [19]

Deibele et al.

[11] Patent Number: 5,013,873
[45] Date of Patent: May 7, 1991

[54] WIREWAY FOR ENCLOSING ELECTRICAL CONDUCTORS

[75] Inventors: Charles Deibele; Albert Deibele, Jr., both of Keil, Wis.

[73] Assignee: Houshold Utilities, Inc., Kiel, Wis.

[21] Appl. No.: 353,878

[22] Filed: May 18, 1989

[51] Int. Cl.5 .............................................. H02G 3/04
[52] U.S. Cl. ....................................... 174/101; 138/92; 138/157; 220/379
[58] Field of Search ...................... 174/68.3, 72 C, 97, 174/101; 138/92, 157, 158, 159, 160, 161, 162, 163; 220/85 CH, 379

[56] References Cited

U.S. PATENT DOCUMENTS

| | | | |
|---|---|---|---|
| 736,916 | 8/1903 | Flinder | 220/85 CH X |
| 1,277,550 | 9/1918 | Connell | 138/163 X |
| 2,291,491 | 7/1942 | Naysmith | 138/157 X |
| 2,316,166 | 4/1943 | Huguelet | 138/157 X |
| 3,312,251 | 4/1967 | Marks et al. | 138/158 |
| 3,325,128 | 6/1967 | Elleboudt | 174/97 X |
| 3,433,270 | 3/1969 | Fischer et al. | 138/162 |
| 4,349,220 | 9/1982 | Carroll et al. | 138/92 X |
| 4,423,284 | 12/1983 | Kaplan | 138/92 X |

FOREIGN PATENT DOCUMENTS 2406327 5/1979 France .................................. 138/162

Primary Examiner—Laramie E. Askin
Attorney, Agent, or Firm—Andrus, Sceales, Starke & Sawall

[57] ABSTRACT

A wireway for enclosing electrical conductors includes a longitudinally extending channel-shaped housing having a cover member removably hinged to the top wall of the housing. The cover may be swung between open and closed positions with the hinge constructed to permit removal of the cover to provide access to the interior of the housing. When removed, the cover may be retained on the front edge of the bottom wall of the housing.

10 Claims, 2 Drawing Sheets

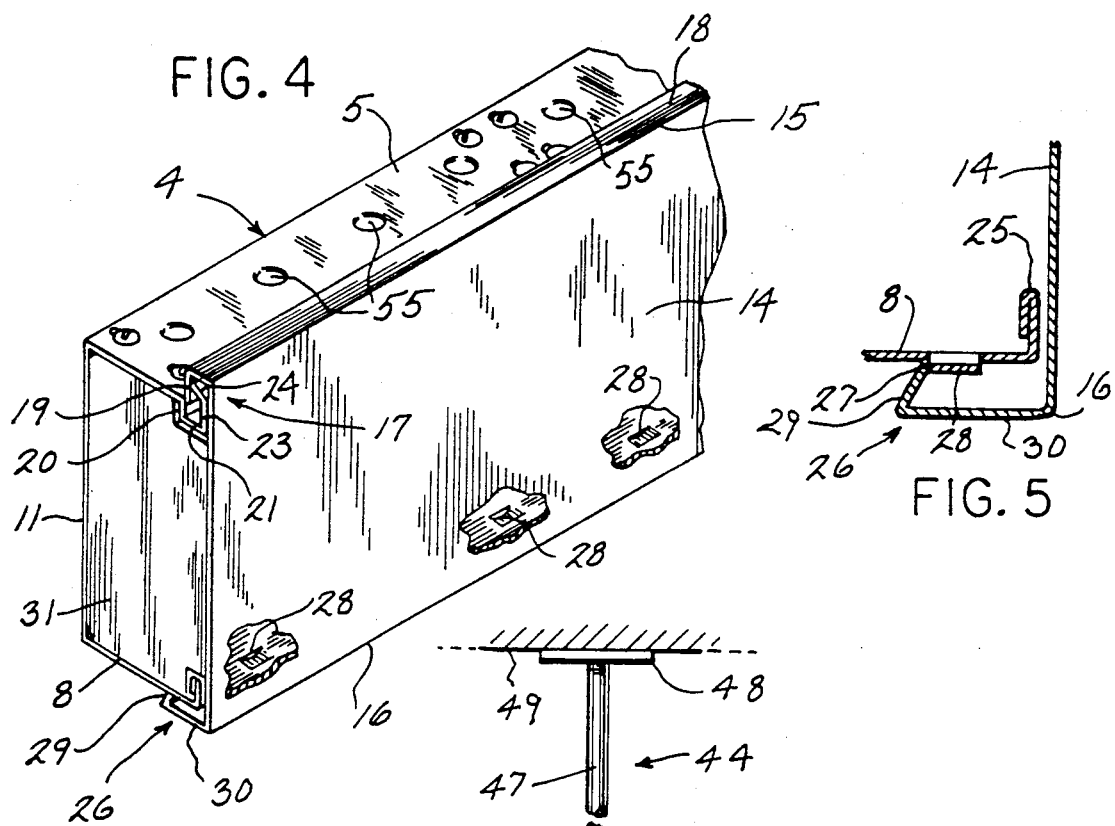
FIG. 4
FIG. 5
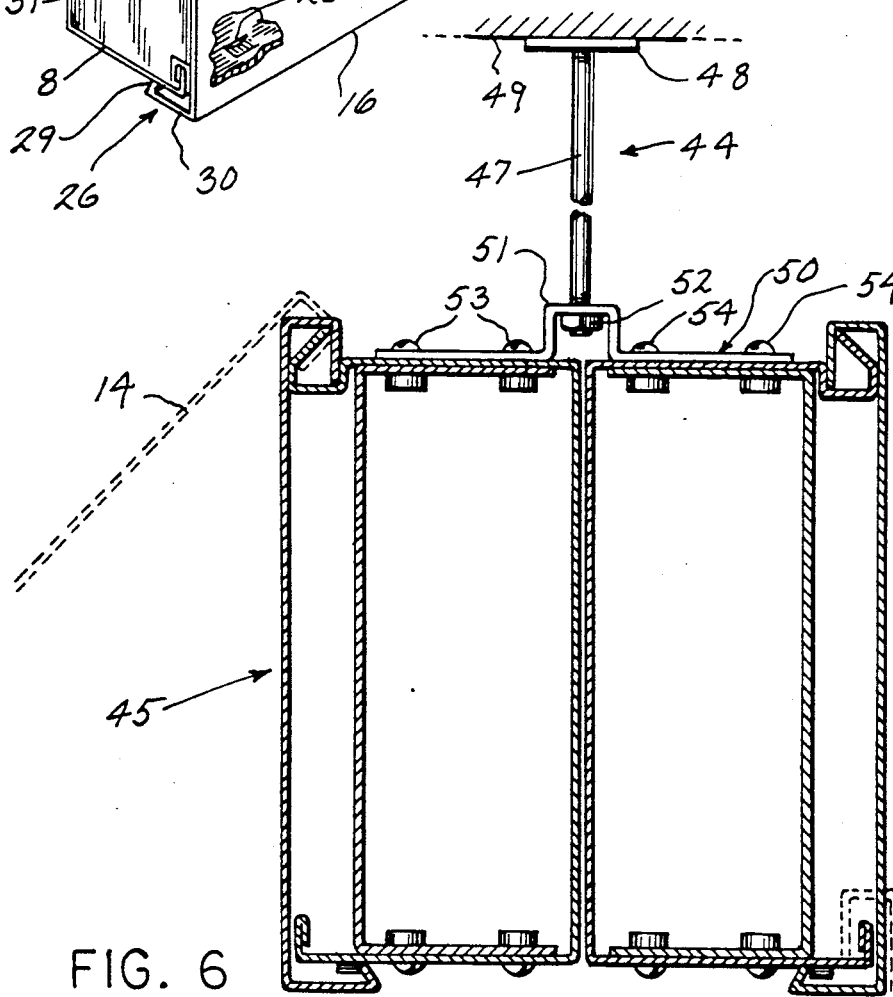
FIG. 6

WIREWAY FOR ENCLOSING ELECTRICAL CONDUCTORS

BACKGROUND OF THE INVENTION

The present invention relates to enclosures, and more particularly to a wireway for enclosing electrical conductors.

Wireways are well known in the construction industry and typically comprise duct-like enclosures for housing electrical conductors such as wires and cables to isolate the conductors and prevent dust, dirt, oil and/or water from coming into contact with the conductors. The entire wireway run is typically comprised of various types of wireway fittings such as straight lengths, elbows and T's. Such fittings are connected together in various combinations so that the wireway run may be employed in various applications.

One such known wireway includes various fittings which are telescopically fit together. Alternately, the edge margins of individual fittings are screwed together.

Although prior wireways provide adequate enclosures for electrical conductors, there remains a need for a multipurpose, inexpensive wireway that may be readily adaptable for use in various applications.

SUMMARY OF THE INVENTION

A wireway for enclosing electrical conductors includes a longitudinally extending channel-shaped housing defining an interior compartment for receiving electrical conductors and a front opening for providing access to the interior compartment together with a longitudinally extending removable cover member for closing the front opening. The removable cover is hingedly mounted to the housing for swinging movement between an open position away from the housing wherein the cover may be removed from the housing and a closed position covering the front opening. Lock means cooperable between the cover member and housing secures the cover member in its closed position.

The wireway preferably also includes a wire retainer means for retaining electrical conductors within the housing when the cover member is moved to its open position as well as a cover retaining means on the housing for retaining the cover member on the housing after the cover member is removed from the housing by a workman. The wire retaining means preferably comprises a brace member extending between the front edges of top and bottom walls of the housing, and the cover retaining means preferably comprises an L-shaped leaf member projecting from the cover member and a flange projecting upwardly from a bottom wall of the housing. Thus, the cover may be conveniently hung from the bottom wall of the housing while a workman has free access to the electrical conductors within the housing.

The hinge mounting of the cover to the top wall of the housing includes the L-shaped leaf member on the cover member as well as a U-shaped leaf member projecting forwardly from the front edge of the top wall. The U-shaped leaf member also enables a workman to place hand tools, screws, nuts and the like equipment on the top wall of the housing without fear of such materials rolling off the top wall and falling to the ground.

BRIEF DESCRIPTION OF THE DRAWINGS

The drawings illustrate the best mode presently contemplated of carrying out the invention.

In the drawings:

FIG. 4 is a fragmentary perspective view with parts broken away illustrating additional components of the wireway of FIG. 1;

FIG. 5 is a fragmentary cross sectional enlarged view illustrating the locking structure for holding the cover in its closed position; and FIG. 6 is a cross sectional side view in elevation of a ceiling hanger connecting back to back wireways.

DESCRIPTION OF THE PREFERRED EMBODIMENTS

Figures 1, 2, 3:
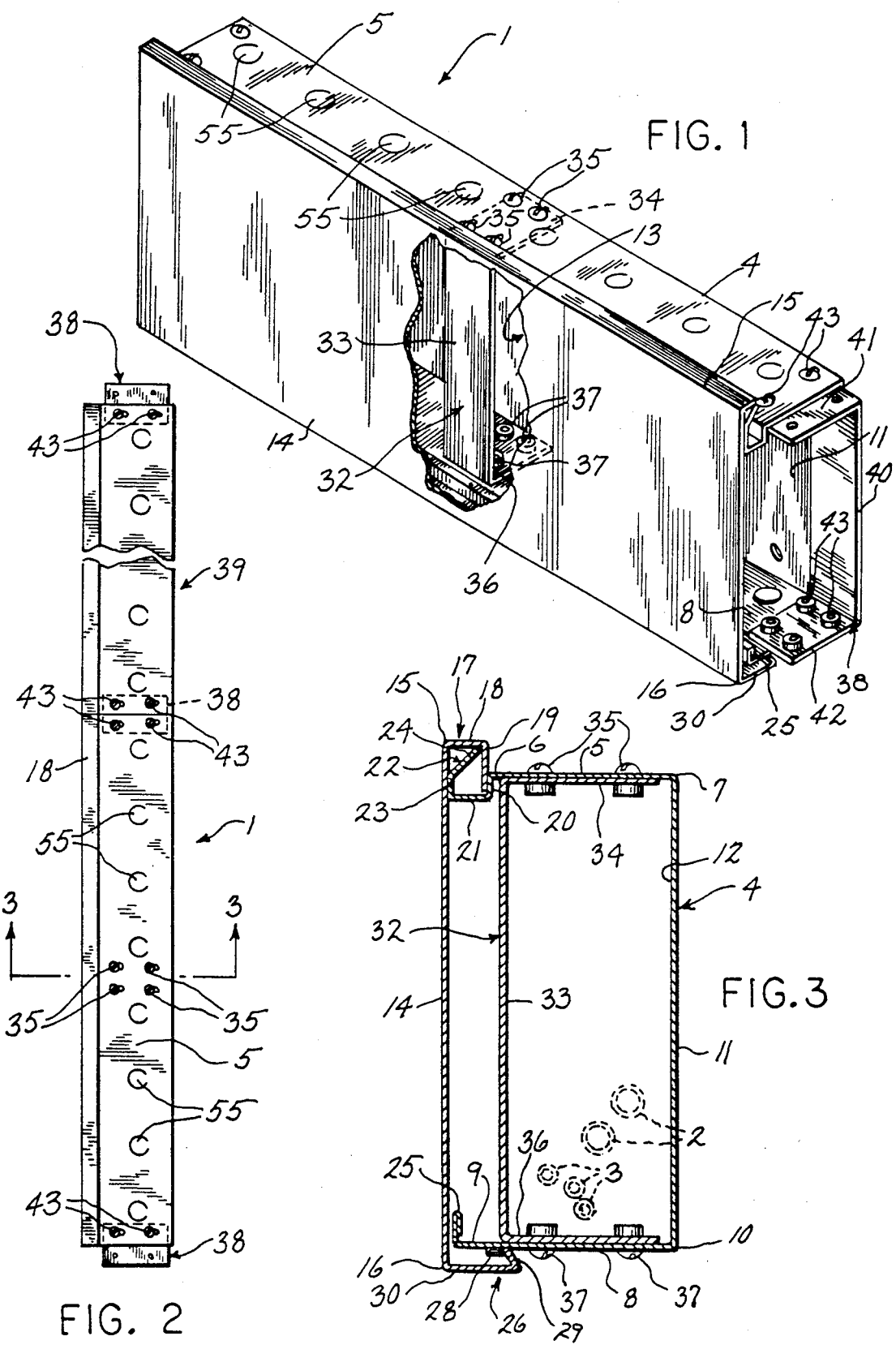
FIG. 1 is a perspective view with parts broken away illustrating a wireway constructed in accordance with the principles of the present invention.
FIG. 2 is a top plan view of a pair of wireways connected together to form a portion of a wireway run.
FIG. 3 is a cross sectional side view in elevation of the wireway taken along the plane of the line 3—3 in FIG. 2.

Referring now to the drawings, FIG. 1 illustrates a wireway generally designated by the numeral 1 for enclosing a plurality of electrical conductors such as cables 2 and wires 3 (see FIG. 3). FIG. 1 illustrates what is typically referred to in this industry as a "straight length" wireway. However, the principles of the present invention apply equally to other wireway fittings not specifically illustrated such as elbows (45°, 90°, 90° sweep elbows and the like) as well as T's. Thus, the principles of the present invention may be applied to an entire family of wireway fittings which are typically employed to construct an entire wireway run.

Referring now to FIGS. 1 and 3, wireway 1 includes a longitudinally extending channel-shaped housing 4 having a top wall 5 with a front edge 6 and a rear edge 7, a bottom wall 8 spaced from top wall 5 and having a front edge 9 and a rear edge 10. A rear wall 11 interconnects the rear edges 7, 10 of top and bottom walls 5, 8 respectively to provide the channel shape of housing 4. As shown best in FIG. 3, top wall 5, bottom wall 8 and rear wall 11 define an interior compartment 12 for receiving electrical conductors such as cables 2 and wires 3. Furthermore, the front edges 6 and 9 of top wall 5 and bottom wall 8, respectively, define a front opening 13 for providing access to compartment 12.

A longitudinally extending removable cover member 14 is employed to close front opening 13. Cover 14 has a top edge 15 and a bottom edge 16 disposed adjacent the respective front edges 6, 9 of top and bottom walls 5, 8 respectively. As shown best in FIG. 1, cover 14 has a longitudinal extent equivalent to the longitudinal extent of housing 4 so that the entire front opening 13 is closed when cover 14 is in its closed position and the entire front opening 13 is accessible when cover 14 is removed from housing 4.

Cover 14 is removably mounted on housing 4 by a hinge 17 which is cooperable between top edge 15 of cover 14 and front edge 6 of top wall 5 for providing swinging movement of cover 14 between an open position away from housing 4 wherein cover 14 may be removed from housing 4 and a closed position covering front opening 13. As shown best in FIG. 6, cover 14 is shown in its closed position in solid lines and in its open position in dashed lines. To provide the desired removable yet swinging movement for cover 14, hinge 17 includes an L-shaped leaf member projecting from top edge 15 of cover 14 which comprises a first leg 18 projecting rearwardly from top edge 15 and a second leg 19 projecting downwardly from leg 18. Hinge 17 also includes a U-shaped leaf member projecting forwardly from front edge 6 of top wall 5 having a third leg 20 projecting downwardly from front edge 6 of top wall 5, a fourth leg 21 projecting forwardly from leg 20 and a fifth leg 22 projecting upwardly from leg 21. Preferably, leg 22 comprises a first straight portion 23 projecting upwardly from leg 21 and a second angled portion 24 projecting rearwardly and upwardly from first portion 23. Angle portion 24 prevents the upper portion of cover 14 from moving laterally with respect to housing 4 since leg 19 is trapped between the outer end of portion 24 and leg 20. Nevertheless, as shown best in FIG. 6, cover 14 may be swung away from housing 4 since legs 18 and 19 pivot about the outer end of portion 24. When pivoted toward its open position as shown in dashed lines in FIG. 6, cover 14 may be removed from housing 4. After removal, cover 14 is designed to be retained on housing 14 at a location which permits easy access to interior compartment 12 by a workman. For this purpose, cover 14 is hung from bottom wall 8 and is retained thereon by a flange 25 projecting upwardly from front edge 9 of bottom wall 8. Flange 25 thus prevents cover 14 from sliding off or falling off the front edge of bottom wall 8. This is best illustrated at the lower righthand side of FIG. 6 wherein cover 14 is shown in dashed lines hung from bottom wall 8.

Cover 14 is secured to housing 4 in its closed position by a lock mechanism generally designated by the numeral 26. As best shown in FIGS. 3–5, lock 26 is cooperable between bottom edge 16 of cover 14 and front edge 9 of bottom wall 8. Lock 26 includes an abutment surface 27 formed on bottom wall 8 and a catch means on bottom edge 16 of cover 14 which is engageable with abutment surface 27. Abutment surface 27 is formed by protrusions 28 stamped from bottom wall 8 at spaced locations along the longitudinal extent thereof. The catch means comprises a lip 29 connected to a flange 30 which in turn is integrally formed with and projects inwardly from bottom edge 16 of cover 14. Lip 29 extends upwardly and is angled toward cover 14 to permit catching of lip 29 on abutment surface 27. Also as shown in FIG. 4, one end, or both ends, of housing 4 may be closed by an end plate 31. Additionally, housing 4 may include a plurality of knockouts 55 to permit multiple connections or splicings with cables 2 and/or wires 3 contained in compartment 12.

As shown best in FIGS. 1 and 3, a brace member 32 is disposed in the interior compartment 12 which functions to not only retain cables 2 and wires 3 within housing 4 when cover 14 is moved to its open position, but also to brace or support top wall 5 and bottom wall 8 apart from one another to provide a rigid construction. Brace member 32 is U-shaped and includes an upwardly extending retaining plate 33 which extends between front edges 6 and 9 of top wall 5 and bottom wall 8, respectively. Brace member 32 also includes a top leg 34 mounted to top wall 5 by screws 35 and a bottom leg 36 mounted to bottom wall 8 by screws 37.

As shown best in FIGS. 1 and 2, a connector 38 is employed for connecting wireway 1 to a second adjacent wireway 39 to provide a wireway run, as shown in FIG. 2. Connector 38 comprises a U-shaped bracket member constructed similar to brace member 32 and thus includes a bracket plate 40 extending between top wall 5 and bottom wall 8 which interconnects a top leg 41 and a bottom leg 42. As best shown in FIGS. 1 and 2, one half of the bracket member is mounted to one end of wireway 1 while the other half of the bracket member is mounted to an adjacent end of wireway 39. Thus, the ends of wireways 1 and 39 are mounted in abutting relationship with one another to provide a continuous enclosure for electrical conductors. The bracket member is preferably mounted by screws 43 to wireways 1 and 39, but any suitable fastener may be employed.

Turning now to FIG. 6, there is illustrated a hanger 44 for mounting a pair of back-to-back wireways 45, 46. Wireway 45 may, for example, be employed to house the AC power side of a system while wireway 46 in turn may be employed to house the control and communication side of the electrical system. Wireways 45, 46 are constructed in a manner identical to wireway 1 and therefore need not further be described herein. Hanger 44 includes a rod 47 connected at its upper end to a plate 48 which in turn is mounted or secured to a ceiling designated by the numeral 49. The opposite end of rod 47 is connected to a mounting bracket 50 by passing through an opening (not shown) in a raised central portion 51 thereof. A nut 52 screwed onto the threaded lower end of rod 47 holds bracket 50 thereon. Wireway 45 is secured by screws 53 to one side of bracket 50 while wireway 46 is secured by screws 54 to the opposite side of bracket 50, as best shown in FIG. 6. As is readily obvious, numerous hangers 44 spaced along the entire wireway run would be employed to mount an entire wireway run.

A wireway has been illustrated and specifically described herein. Various modifications and/or substitutions of the specific components described may be made without departing from the scope of the present invention. For example, the wireway may be composed of various materials depending upon the desired application thereof.

Various modes of carrying out the invention are contemplated as being within the scope of the following claims particularly pointing out and distinctly claiming the subject matter regarded as the invention.

We claim:

1. A wireway for enclosing electrical conductors, comprising:

a longitudinally extending housing including a top wall having a front edge and a rear edge, a bottom wall spaced from said top wall and having a front edge and a rear edge, and a rear wall interconnecting the rear edges of said top and bottom walls, said top, bottom and rear walls defining an interior compartment for receiving electrical conductors and said front edges defining a front opening for providing access to said compartment;

a longitudinally extending removable cover member for closing said front opening, said cover member having a top edge and a bottom edge disposed adjacent the respective front edges of said top and bottom walls;

hinge means cooperable between the top edge of said cover member and the front edge of said top wall for providing swinging movement of said cover member between an open position away from said housing wherein said cover member may be removed from said housing and a closed position covering said front opening, said hinge means comprising an L-shaped leaf member having a first leg projecting rearwardly from the top edge of said cover member and a second leg projecting downwardly from said first leg, and a U-shaped leaf member having a third leg projecting downwardly from said front edge of said top wall, a fourth leg projecting forwardly from said third leg and a fifth leg projecting upwardly from said fourth leg, said fifth leg including a first straight portion projecting upwardly from said fourth leg and a second angled portion projecting rearwardly and upwardly from said first portion to a height above the front edge of said top wall to form a tool-retaining lip;

lock means cooperable between the bottom edge of said cover member and the front edge of said bottom wall for securing said cover member in its closed position; and cover retaining means on said bottom wall for retaining said cover member on said housing after said cover member is removed from said housing, said cover retaining means comprising a flange projecting upwardly from the front edge of said bottom wall.

2. The wireway of claim 1 wherein said lock means comprises an abutment surface on one of said edges and a catch means on the other of said edges engageable with said abutment surface.

3. The wireway of claim 2 wherein said abutment surface is formed by a protrusion on said bottom wall and said catch means comprises a lip formed on the bottom edge of said cover member.

4. The wireway of claim 1 further including connector means for connecting said housing to a second housing disposed longitudinally adjacent thereto.

5. The wireway of claim 4 wherein said connector means comprises a U-shaped bracket member.

6. The wireway of claim 1 further including wire retaining means for retaining electrical conductors within said housing when said cover member is moved to its open position.

7. The wireway of claim 6 wherein said wire retaining means comprises a brace member in said interior compartment having an upwardly extending retaining plate spaced from said rear wall.

8. The wireway of claim 7 wherein said retaining plate extends between the front edges of said top and bottom walls.

9. The wireway of claim 8 wherein said brace member is U-shaped with one leg of the U mounted to said top wall and the other leg of the U mounted to said bottom wall.

10. The wireway of claim 1 wherein said flange extends longitudinally along the entire length of said bottom wall.

* * * * *